Dec. 7, 1937.                W. WOLFE                2,101,770
                           MILK STRAINER
                        Filed Feb. 16, 1937         2 Sheets-Sheet 1
Fig. 1.
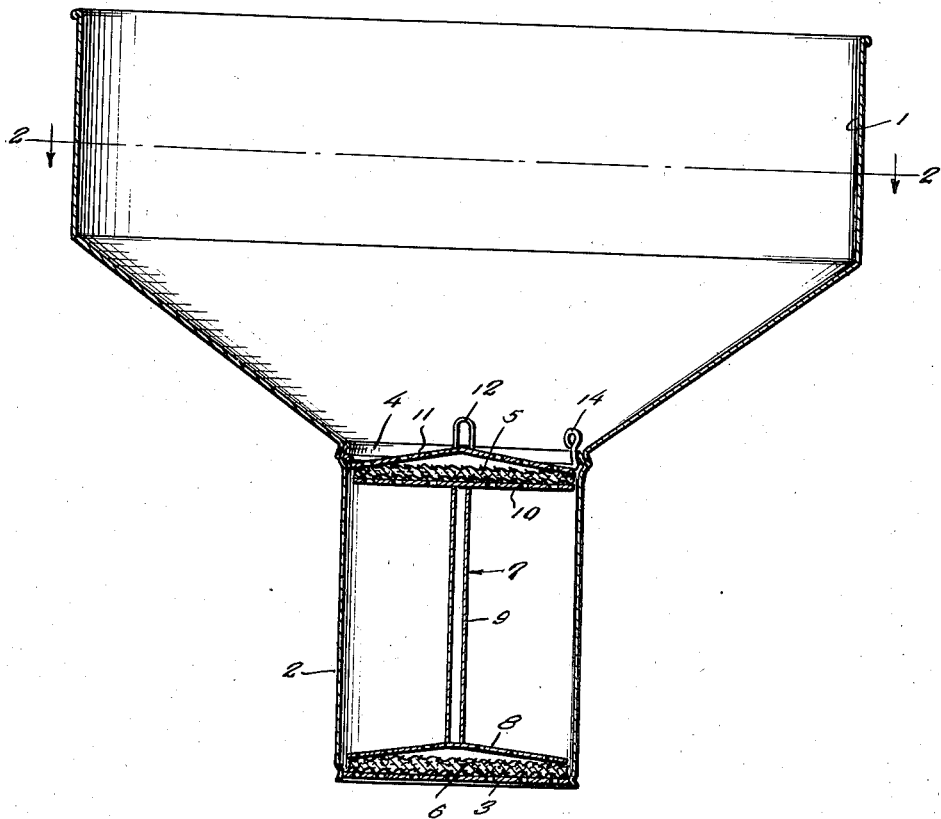
Fig. 6.
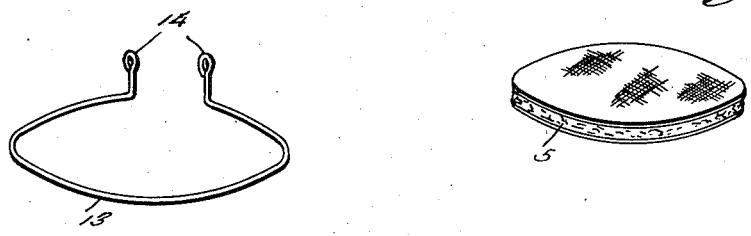
Fig. 5.
Inventor
Wilbur Wolfe
By Clarence A. O'Brien
   Hyman Berman
                Attorneys Dec. 7, 1937. W. WOLFE 2,101,770
MILK STRAINER
Filed Feb. 16, 1937 2 Sheets-Sheet 2

Inventor
Wilbur Wolfe
By Clarence A. O'Brien
Hyman Berman
Attorneys

Patented Dec. 7, 1937

2,101,770

UNITED STATES PATENT OFFICE 2,101,770

MILK STRAINER

Wilbur Wolfe, Carmel, Ind.

Application February 16, 1937, Serial No. 126,041

4 Claims. (Cl. 210—158)

The present invention relates to new and useful improvements in milk strainers or filters and has for one of its important objects to provide a novel construction, combination and arrangement whereby the milk will pass through a plurality of straining elements or members in a manner to be thoroughly cleaned thereby.

Another very important object of the invention is to provide a strainer of the aforementioned character embodying upper and lower pads, together with novel means for spacing said pads.

Still another important object of the invention is to provide a milk strainer of the character described wherein the pads may be readily removed for replacement and other portions removed for cleaning, thereby promoting sanitation.

Other objects of the invention are to provide a milk strainer which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in vertical section through a milk strainer constructed in accordance with the present invention.

Figure 5 is a detail view in perspective of the split, resilient ring which secures the assembly in the neck.

Figure 6 is a detail view in perspective of one of the pads.

Figure 2:
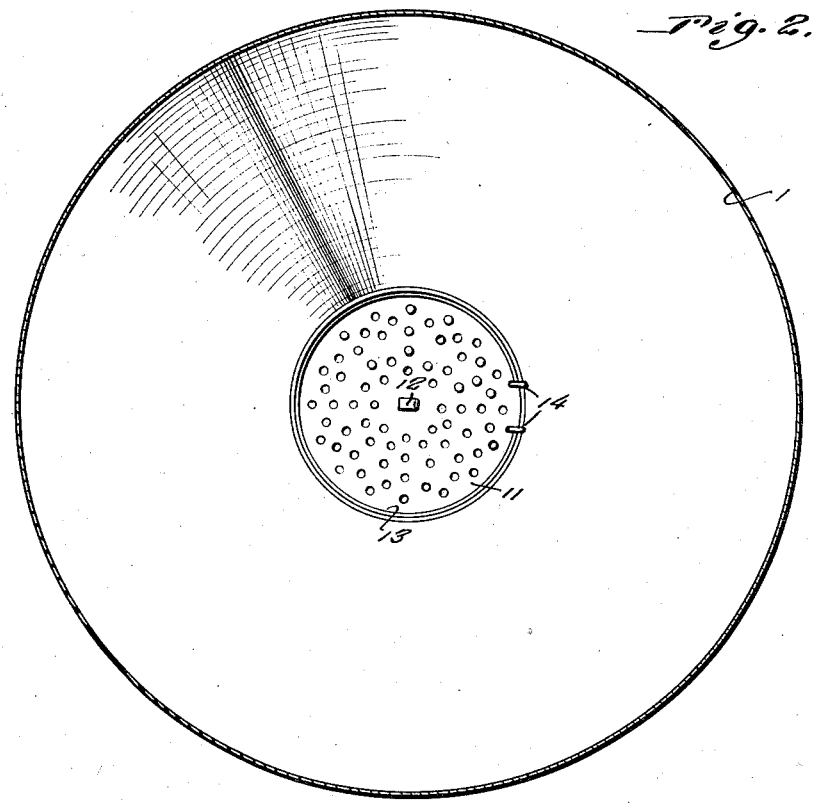
Figure 2 is a view in horizontal section, taken substantially on the line 2—2 of Fig. 1.
Figure 3:
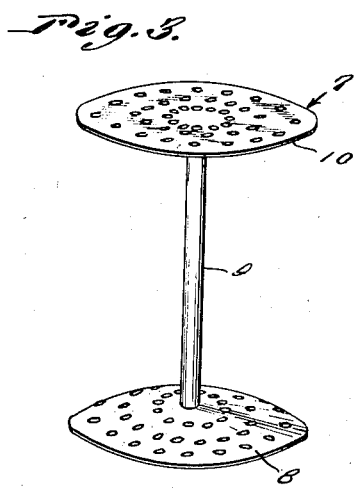
Figure 3 is a detail view in perspective of the pad spacing unit.
Figure 4:
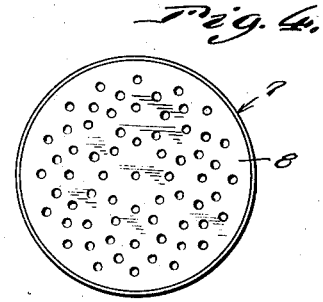
Figure 4 is a detail view in bottom plan of the pad spacing unit.

Referring now to the drawings in detail, it will be seen that the embodiment of the invention which has been illustrated comprises a funnel 1 of suitable dimensions, said funnel including a substantially cylindrical depending discharge neck 2. Fixed in the lower end portion of the neck 2 is a perforated bottom 3. Formed in the upper end portion of the neck 2 is a circumferential groove or channel 4.

The reference numerals 5 and 6 designate, respectively, laminated upper and lower removable pads in the neck 2. The lower pad 6, it will be noted, rests on the perforated bottom 3 of the neck 2. The pads 5 and 6 are spaced from each other by a removable unit which is designated generally by the reference numeral 7.

The removable pad spacing unit 7 comprises a perforated cone 8 of suitable metal which rests on the lower pad 6. Fixed to the perforated cone 8 and rising therefrom is a tubular stem 9 having fixed on its upper end a perforated disc 10. The upper pad 5 is adapted to rest on the perforated disc 10, as shown to advantage in Fig. 1 of the drawings.

Mounted on the upper pad 5 is a removable perforated cone 11, also of any suitable metal. Secured to the perforated cone 11 is a bail 12 to facilitate inserting and removing said perforated cone. The reference numeral 13 designates a split, resilient ring which is engageable in the groove or channel 4 for removably securing the members 5 to 11, inclusive, in position in the neck 2, said split ring including upstanding handles 14 on its ends for engagement by the thumb and index finger of the hand to facilitate contracting said ring.

It is thought that the operation of the invention will be readily apparent from a consideration of the foregoing. Milk which is poured into the funnel 1 is thoroughly cleaned by passing first through the perforated cone 11, then through the upper pad 5, then through the perforated disc 10, then through the perforated cone 8, then through the lower pad 6, and finally through the perforated bottom 3 of the neck 2. When desired, the upper pad 5 may be conveniently removed for replacement by simply removing the split securing ring 13 and the perforated cone 11. Also, the lower pad 6 may be conveniently removed by removing the spacing unit 7 from the neck 2.

It is believed that the many advantages of a milk strainer constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed. For example, the perforated member 3 may also be removable from the cylindrical neck 2, if desired.

What is claimed is:—

1. A strainer comprising a funnel including a depending discharge neck, a perforated bottom in the lower portion of said discharge neck, a removable pad mounted on said bottom, a perforated member resting on the pad, a stem rising from said perforated member, a second perforated member supported on the upper end of the stem, and a second pad resting on the second perforated member.

2. A strainer comprising a funnel including a depending discharge neck, a perforated bottom in the lower portion of said discharge neck, a removable pad mounted on said bottom, a removable spacing unit mounted on the pad, and another pad removably mounted on said spacing unit in the upper portion of the neck, said spacing unit including a perforated cone resting on the first named pad, a stem fixed to said cone and rising therefrom, and a perforated disc fixed on the upper end of said stem and adapted to support the second named pad.

3. A milk strainer comprising a funnel including a depending discharge neck, a perforated bottom in said discharge neck, removable upper and lower pads in the discharge neck, said lower pad resting on the perforated bottom of the discharge neck, a perforated cone resting on the lower pad, a stem rising from said cone, a perforated plate supported on the upper end of the stem and on which the upper pad is seated and a removable perforated cone mounted on the upper pad.

4. A milk strainer comprising a funnel including a substantially cylindrical, depending discharge neck, a perforated bottom in said discharge neck, removable upper and lower pads in the discharge neck, removable means in the discharge neck for spacing the upper and lower pads, said lower pad resting on the perforated bottom of the discharge neck, a removable perforated cone mounted on the upper pad, the upper portion of the discharge neck having a circumferential channel therein, and a split, resilient ring engageable in the channel for removably securing the pads, the spacing means for said pads and the perforated cone in position, said spacing means comprising a perforated cone resting on the lower pad, a stem fixed on the second named cone and rising therefrom, and a perforated disc fixed on the upper end of said stem and adapted to support the upper pad.

WILBUR WOLFE.